United States Patent [19]

Duke

[11] 3,983,616

[45] Oct. 5, 1976

[54] APPARATUS FOR ASSEMBLING LIDS TO GLASS CONTAINERS

[75] Inventor: Charles W. Duke, Huntington, W. Va.

[73] Assignee: Owens-Illinois, Inc., Toledo, Ohio

[22] Filed: Jan. 21, 1976

[21] Appl. No.: 651,091

[52] U.S. Cl. ................................ 29/208 B; 29/240; 29/211 R; 53/314; 53/315; 53/317

[51] Int. Cl.²........................ B67B 3/20; B65B 7/28; B23P 19/04

[58] Field of Search.............. 29/208 B, 240, 200 A, 29/456, 211 R; 53/38, 7, 314, 313, 315, 317

[56] References Cited

UNITED STATES PATENTS

| | | | |
|---|---|---|---|
| 1,426,056 | 8/1922 | Frazier | 53/317 |
| 2,218,452 | 10/1940 | Jackson | 53/317 X |
| 2,991,607 | 7/1961 | Menheneott | 53/317 |
| 3,071,909 | 1/1963 | Elleman | 53/315 |
| 3,477,202 | 11/1969 | Zetterberg | 53/315 |

*Primary Examiner*—Travis S. McGehee
*Assistant Examiner*—Horace M. Culver
*Attorney, Agent, or Firm*—A. J. Steger; E. J. Holler

[57] ABSTRACT

This invention relates to an apparatus for moving a plurality of two-piece canning jar-type lids in series to a feed mechanism in the form of a magazine which will single-line the caps and maintain them in assembled position. The single-lining mechanism is designed to feed lids into the path of movement of a plurality of containers, also moving in series on their sides with their axes horizontal. The caps or lids are carried at an angle to the path of movement of the finish of the jars such as that the finish of the jars or containers will each individually remove a cap from the supply of caps. The caps are then retained on the finish of the jar and are moved with the jar, in a linear path, with the caps being rotated by frictional engagement and thereby threaded onto the finish of the containers.

7 Claims, 3 Drawing Figures

FIG. 3
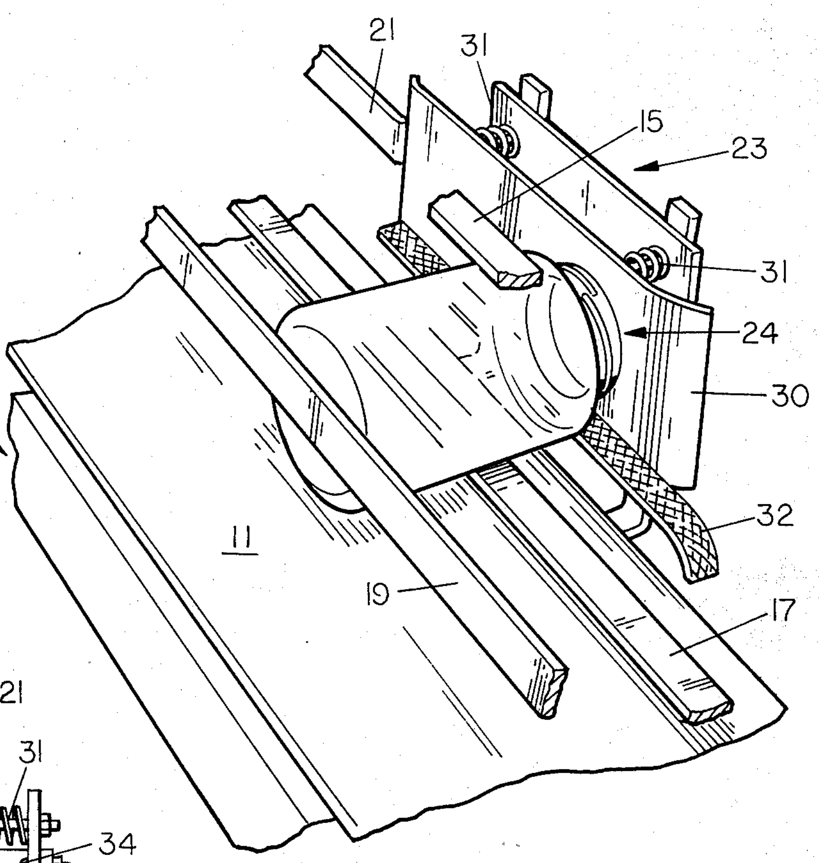
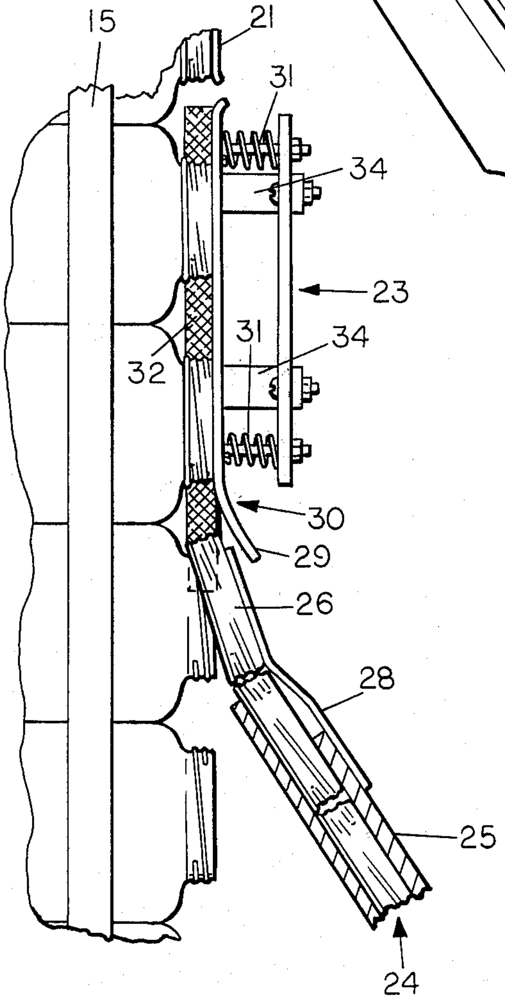
FIG. 2

APPARATUS FOR ASSEMBLING LIDS TO GLASS CONTAINERS

BACKGROUND OF THE INVENTION

In the art of assembling closures to containers, it has been the practice to feed the closures one at a time into intercepting relationship with respect to the finish of the containers to which they are to be applied. This normally takes place while the containers are full of a product that is to be shipped in the containers. In the case of the shipment of home-canning jars, it has been the practice in the past to package the jars for shipment separately and the closures or lids be packed separate also. It is common practice now to market the style of "home canning" lids which are formed of a disc-shaped panel that is loosely retained in an annular threaded skirt. These typically have also been packaged as separate items capable of being purchased separate from the containers.

When closures are of a one-piece construction, handling them is relatively easy; however, when they are of a two-piece construction, with the panel and skirt separate and when assembled will fall apart easily due to lack of any interlocking, putting the closures on the jars at a high speed becomes more of a task. It has been suggested by existing prior art to move the closures in inverted position with their panels down and the skirts extending upwardly from the panel and then threading them on containers that are turned upsidedown. Obviously, this system applies only to the situation where the closures are being applied to unfilled containers.

The reason for feeding closures in inverted position is to maintain the two units of the closures in assembled position. It has also been the practice in the past, to put the closures on by hand. Again, this then becomes a fairly labor-intensive-operation, and, therefore, less economical than an apparatus which will apply the two-piece closures to containers at fairly high rates of speed and with minimum maintenance required. It has also been suggested that the two-pieces of the closure be interlocked in some manner; however, this requires special tooling for the components and also will require special assembly techniques, all of which add to the expense of the closures.

SUMMARY OF THE INVENTION

An apparatus for assembling threaded, two-piece closures to glass containers wherein the containers are moved in series by a conveyor and then are turned 90° so that their axes are horizontal. The jars or containers are pushed by line pressure in a line while at the same time the assembled closures are brought into engagement with the threaded skirt engaging the leading edge of the finish of the container such that the closure is caught by the leading edge of the container and moved through an assembly zone. In the assembly zone is apparatus for causing two-piece closures to be rotated relative to the container so that the closures become threaded on the container.

BRIEF DESCRIPTION OF THE DRAWINGS

FIG. 2 is a plan view of the assembly apparatus, where the closures are applied to the containers; and FIG. 3 is a perspective view of the assembly apparatus illustrating a single container with the cap threaded thereon.

DETAILED DESCRIPTION OF THE DRAWINGS

Figure 1:
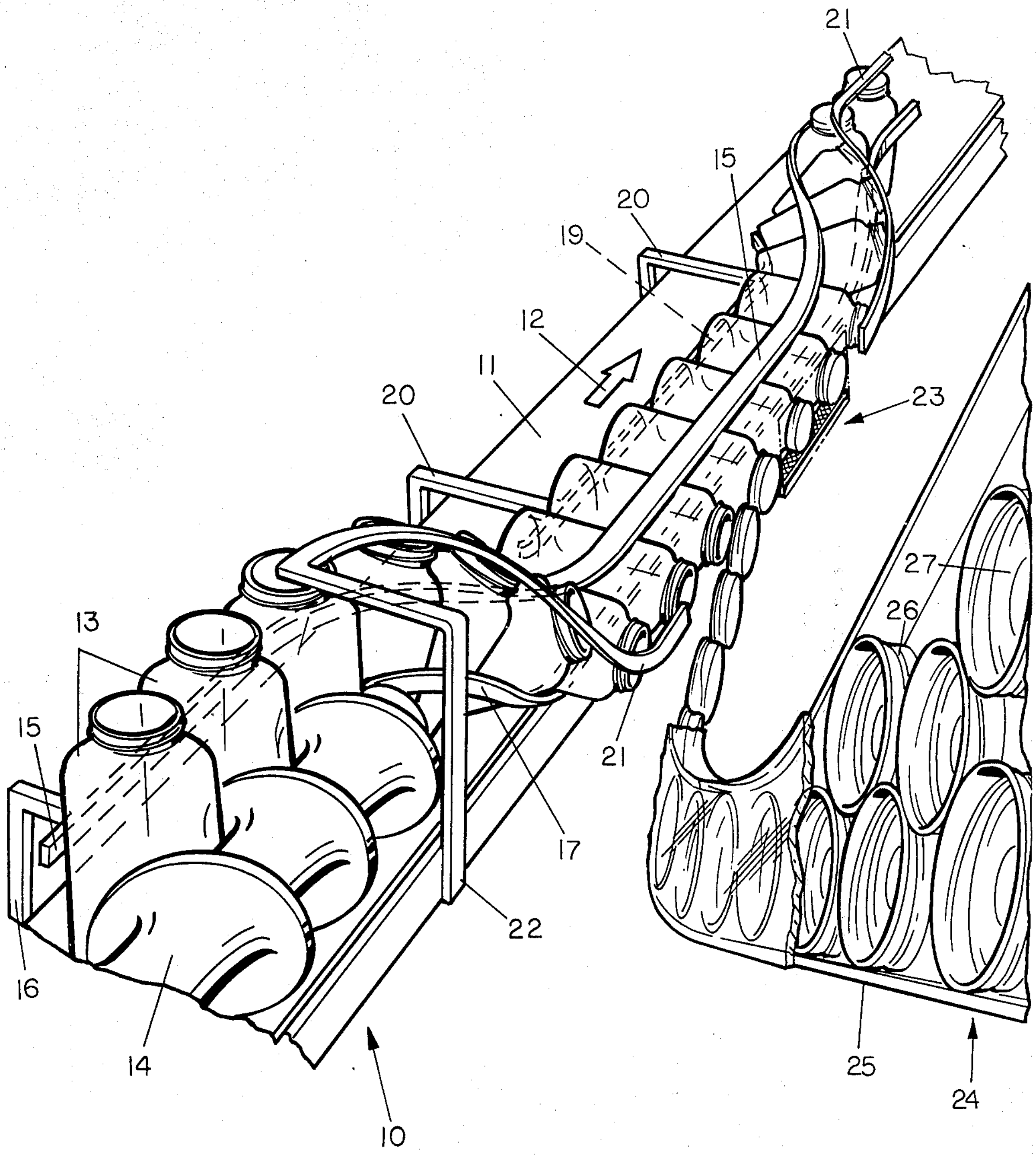
FIG. 1 is a perspective view of a bottle handling and closure feeding apparatus according to the invention.

With reference to FIG. 1, there is shown a conveyor generally designated 10 having a horizontal moving upper surface 11 which is moving in the direction of arrow 12 shown thereon. A plurality of containers 13, typically termed "home-canning" jars, have their bases resting on the conveyor surface 11. As the containers are moved to the right by the conveyor surface, as viewed in FIG. 1, they are engaged by a helical screw 14 rotating in a counter-clockwise direction. The containers become confined between the grooves of the screw 14 and a rail 15. The rail 15 is supported by a bracket 16 which in turn is supported by the conveyor. As can best be seen in FIG. 1, the rail 15 extends above and generally parallel to the surface 11 of the conveyor 10 and then bends to the right and downwardly, as viewed in FIG. 1, until it is in a horizontal position serving to overlay and engage the sides of the jars. Movement of the jars in series will cause them to rotate 90° until their vertical axes are turned horizontal. A second rail 17, having its forward end at approximately the exit end 18 of the screw 14, engages the opposite side of the containers 13 after leaving the screw 14. The rail 17 likewise is bent such that it parallels the direction of the rail 15 and supports the run of the containers as they are pushed with their axes substantially horizontal. The rail 17 is spaced slightly above the surface 11 of the conveyor 10 so that movement of the containers, when in their horizontal attitude, is by pushing and not through movement of the surface 11 of the conveyor 10. at approximately the position where the containers begin to turn out of a vertical attitude, a third rail 19 carried by brackets 20 and having a similar bent configuration to that of rail 17, engages the bottom of the containers 13. The finish or upper ends of the containers are confined loosely against the rail 19 by a fourth rail 21. The rail 21 in turn is supported by a bracket 22, it being understood that all of the brackets are attached to the bed of the conveyor 10. As can best be seen in FIG. 1, the fourth rail 21 overlies the finish or upper threaded end of the containers at about the position of the exit end 18 of the screw 14 and serves to retain the bottles in a substantially linear relationship as they are turned through 90°. However, the rail 21 is interrupted through a portion of the horizontal path of movement of the bottles and again appears at the exit end of the assembly apparatus. The assembly apparatus is generally designated 23. This apparatus 23 is shown in greater detail in FIGS. 2 and 3.

A supply of assembled closures 24, carried in a magazine 25, are fed thereto in a suitable manner such that they may not become disassembled during their movement into a single line approaching the assembly apparatus 23. The magazine 25 is configured such that it has a thickness just slightly larger than the total height of a skirt portion 26 of the closures 24. As shown in FIG. 1, the magazine is formed as a converging wall member which serves to store closures and permit them to progress, by gravity, to the lower outlet that is adjacent the assembly apparatus 23. Because the magazine itself is always oriented at an angle that is slightly less than vertical, panels 27 tend to be retained in the right-hand end of the skirt portion 26 and, as viewed in FIG. 2, the skirt portion 26 will become engaged with the leading edge of the finish portion of the container with the result that the closure 24 will be stripped from the magazine 25. Further, the magazine is provided with a transparent front surface for viewing the closures as they are moving down therein.

As best shown in FIg. 2, the magazine 25 is provided with a spring member 28 which guides and ensures that the assembled closure 24 remains in engagement with the finish of the container until the container moves to the right in FIG. 1 or until the bent end 29 of a retaining shoe 30 engages the closure. The shoe 30 is biased in the direction of the container and closure by a plurality of compression springs 31. In this manner the closures are held firmly against the threaded finish of the containers. The caps or closures 24 are rotated relative to the containers by engagement of their skirt portions 26 around the periphery thereof with a friction member 32. Member 32 may be formed of a bar with a rubber or rubber-like material on its upper surface. The level at which the friction member 32 is positioned is such that the weight of the container and lid combination will be on the surface of the friction member 32 and, in effect, as the two members are pushed or moved in a horizontal direction, the cap is processed or rotated in a clockwise direction so that the closure becomes threaded onto the threads of the container during the short transit period illustrated by the length of the shoe 30 in FIG. 2.

After the closures or caps are assembled and threaded on the containers, the containers are returned to an upright position by reverse bends formed in the rails 15, 17, 19 and 21. It should be understood that the rail 21 is interrupted so that it will not interfere with the application of the caps to the container or the threading onto the container and, therefore, does not exist in the horizontal run of the containers in the assembly area 23. The shoe 30, as is apparent, is springmounted relative to a stationary plate 33 which in turn is supported from the conveyor bed by brackets 34.

It should be understood that the foregoing description is by way of illustration of an apparatus which conforms to the best mode of the invention. When the apparatus is operating and properly maintained, it will apply closures to containers at a relative high rate. The closures obviously have to be properly oriented in the magazine and the containers must move through the assembly zone without substantial rotation so that the closures are threaded by frictional engagement with the friction member 32 to perform the essential relative movement of the closures or lids and the glass containers. Furthermore, while a specific apparatus is disclosed, it should be readily understood that the apparatus may be modified in some non-essential respects, the essential feature of this invention being that the closures are assembled with the containers in substantially horizontal attitude, thus providing the opportunity to have two-piece closures automatically and quickly engaged with the finishes of the containers thereof without the danger of having a complete separation of the panel and skirt portion of the closure during the transport and engagement of the closures with the containers.

Furthermore, the apparatus of the invention provides an arrangement for quickly joining lids to home-canning jars for shipment as a unit, thus permitting the housewife to buy a complete unit which may be filled and sealed. This is important in those circumstances where, frequently the markets have either closures or glass containers, but not both.

I claim:

1. Apparatus for assembling threaded, two-piece closures to glass containers comprising:

a conveyor for moving containers in an upright position in series;

means for engaging the moving containers and turning the containers with their axes substantially horizontal with the threaded finish of the containers extending in the same direction;

means for moving assembled two-piece closures in series, on edge to an assembly point adjacent the finish of the containers, said closures having their open ends facing in the direction of the container finishes;

means for guiding the leading edge of the closure skirt into engagement with the container finish as the two are moving in a generally parallel, linear path;

means for maintaining the container and closure in firm engagement; and stationary means engaging the side of the skirt of the closure while maintaining the container in a relative nonrotative state whereby the closure is rotated relative to the container finish and threaded thereon.

2. The apparatus of claim 1 further including means for supporting the containers elevated from said conveyor when the containers are generally horizontal.

3. The apparatus of claim 1 wherein said means for maintaining said container and closure in firm engagement comprises a vertical plate and means for biasing said plate in the direction of the containers.

4. The apparatus of claim 3 wherein said biasing means comprises a plurality of compression springs.

5. The apparatus of claim 1 further including means for uprighting the containers after the closure has been applied to the containers.

6. The apparatus of claim 3 further including guide means for returning the containers to an upright position after the closure has been applied thereto.

7. The apparatus of claim 1 wherein said means comprises a rubber covered member positioned along the path of movement of the containers at the approximate level of the side of the closures.

* * * * *